(12) United States Patent
Wilder et al.

(10) Patent No.: US 10,073,865 B2
(45) Date of Patent: *Sep. 11, 2018

(54) CONTENT SHARING

(71) Applicant: START PROJECT, LLC, Corte Madera, CA (US)

(72) Inventors: Nicholas Wilder, Boulder, CO (US); Narendra Rocherolle, Mill Valley, CA (US); Julie Davidson Rocherolle, Mill Valley, CA (US)

(73) Assignee: START PROJECT, LLC, Corte Madera, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/134,079

(22) Filed: Apr. 20, 2016

(65) Prior Publication Data
US 2016/0232184 A1    Aug. 11, 2016

Related U.S. Application Data

(63) Continuation of application No. 13/411,317, filed on Mar. 2, 2012, now Pat. No. 9,336,276, which is a
(Continued)

(51) Int. Cl.
*G06F 17/30* (2006.01)
*G06Q 10/10* (2012.01)
*G06Q 50/00* (2012.01)

(52) U.S. Cl.
CPC .... *G06F 17/30289* (2013.01); *G06F 17/3056* (2013.01); *G06F 17/30525* (2013.01);
(Continued)

(58) Field of Classification Search
CPC ......... G06F 17/30525; G06F 17/30551; G06F 17/30522; G06F 17/30964; G06F 17/3053; G06F 17/30669
USPC ........ 707/627, 669, 704, 713, 802; 709/203, 709/204, 205, 215, 228, 753; 705/7.18, 705/14.49
See application file for complete search history.

(56) References Cited

U.S. PATENT DOCUMENTS 6,047,259 A    4/2000  Campbell et al.
6,175,831 B1   1/2001  Weinreich et al.
(Continued)

OTHER PUBLICATIONS

"Who Sees Your Calendar?" Computing at Cornell [online]. Last modified May, 25, 2007 [Retrieved on Sep. 2, 2008]. Retrieved from the Internet: <URL: www.cit.cornell.edu/calendar/howto/access> (5pgs).
(Continued)

*Primary Examiner* — Shahid Alam
(74) *Attorney, Agent, or Firm* — North Weber & Baugh LLP

(57) ABSTRACT

Disclosed are embodiments of systems and methods that allow for the robust, flexible, and efficient sharing of content. In embodiments, content items may be associated with labels, tags, or other identifiers, third parties may be associated with labels, tags, or other identifiers, and sharing with the third party may be based upon comparisons of the labels, tags, or other identifiers associated with the content items and the labels, tags, or other identifiers associated with the third parties.

16 Claims, 10 Drawing Sheets

Related U.S. Application Data continuation of application No. 12/020,446, filed on Jan. 25, 2008, now Pat. No. 8,161,069.

(60) Provisional application No. 60/887,797, filed on Feb. 1, 2007.

(52) U.S. Cl.
CPC ..... G06F 17/30551 (2013.01); G06Q 10/109 (2013.01); G06Q 50/01 (2013.01)

(56) References Cited

U.S. PATENT DOCUMENTS

| | | | |
|---|---|---|---|
| 6,262,735 | B1 | 7/2001 | Etelapera |
| 6,571,245 | B2* | 5/2003 | Huang ............... G06F 17/30867 707/802 |
| 6,820,204 | B1* | 11/2004 | Desai .................. G06F 21/6245 705/51 |
| 7,069,308 | B2 | 6/2006 | Abrams |
| 7,174,517 | B2* | 2/2007 | Barnett ............ G06Q 10/06314 715/751 |
| 7,370,282 | B2 | 5/2008 | Cary |
| 7,421,660 | B2 | 9/2008 | Charnock et al. |
| 7,571,108 | B1 | 8/2009 | Leban |
| 7,739,597 | B2* | 6/2010 | Wong ................ G06F 17/30017 715/717 |
| 7,747,639 | B2 | 6/2010 | Kasperski et al. |
| 7,757,176 | B2* | 7/2010 | Vakil .................... G06Q 10/109 715/751 |
| 2001/0014859 | A1 | 8/2001 | Itoh et al. |
| 2002/0044687 | A1 | 4/2002 | Federman |
| 2002/0078007 | A1* | 6/2002 | Herrero ................ G06Q 10/10 707/669 |
| 2002/0089551 | A1* | 7/2002 | Hugh ............... G06F 17/30994 715/853 |
| 2002/0193995 | A1 | 12/2002 | Case et al. |
| 2003/0033296 | A1* | 2/2003 | Rothmuller ....... G06F 17/30017 707/713 |
| 2003/0110169 | A1* | 6/2003 | Zuili ........................ C12N 9/16 707/783 |
| 2003/0120684 | A1* | 6/2003 | Zuili ................... G06F 21/6209 707/716 |
| 2003/0154116 | A1 | 8/2003 | Lofton |
| 2003/0167279 | A1 | 9/2003 | Smiga et al. |
| 2004/0103367 | A1 | 5/2004 | Riss et al. |
| 2004/0148275 | A1 | 7/2004 | Achlioptas |
| 2005/0108267 | A1 | 5/2005 | Gibson et al. |
| 2005/0216550 | A1 | 9/2005 | Paseman et al. |
| 2005/0246316 | A1 | 11/2005 | Lawson et al. |
| 2006/0135264 | A1 | 6/2006 | Shaw et al. |
| 2006/0230043 | A1* | 10/2006 | Sumner-Moore ........................... G06F 21/6218 707/783 |
| 2006/0242581 | A1* | 10/2006 | Manion .................. G06Q 10/10 715/733 |
| 2007/0055656 | A1 | 3/2007 | Tunstall-Pedoe |
| 2007/0073694 | A1* | 3/2007 | Picault .................... H04L 63/18 707/783 |
| 2007/0083552 | A1 | 4/2007 | Allen et al. |
| 2007/0156522 | A1 | 7/2007 | Carpenter et al. |
| 2007/0156912 | A1* | 7/2007 | Crawford ........... G07C 9/00031 709/229 |
| 2007/0173325 | A1 | 7/2007 | Shaw et al. |
| 2007/0218900 | A1 | 9/2007 | Abhyanker |
| 2007/0219950 | A1* | 9/2007 | Crawford ................ G06F 21/34 707/716 |
| 2007/0220063 | A1 | 9/2007 | O'Farrell et al. |
| 2007/0282595 | A1 | 12/2007 | Tunning et al. |
| 2010/0015975 | A1* | 1/2010 | Issa ....................... H04L 63/102 709/205 |

OTHER PUBLICATIONS

"Migrating Data to Oracle Content Management SDK" Oracle, pp. 1-16, 2002.

* cited by examiner

CONTENT SHARING

CROSS-REFERENCE TO RELATED PATENT APPLICATIONS

This application is a continuation application of and claims priority under 35 USC § 120 to U.S. patent application Ser. No. 13/411,317, entitled "CONTENT SHARING," filed on Mar. 2, 2012, listing Nicholas Wilder, Narendra Rocherolle, and Julie Davidson Rocherolle as inventors, which a continuation application of and claims priority under 35 USC § 120 to U.S. Pat. No. 8,161,069, entitled "CONTENT SHARING USING METADATA," issued on Apr. 17, 2012, listing Nicholas Wilder, Narendra Rocherolle, and Julie Davidson Rocherolle as inventors, which claimed priority under 35 USC § 119(e) to U.S. Provisional Application Ser. No. 60/887,797, entitled "TAG SHARING," filed Feb. 1, 2007. Each of the aforementioned patent documents is incorporated by reference herein in its entirety.

BACKGROUND

A. Technical Field

The present invention pertains generally to content sharing, and relates more particularly to systems and methods that allow for simplified sharing of content.

B. Background of the Invention

The explosion of "social media" on the Internet has led to extensive sharing of information including such items as links, blogs, photos, video, schedules, or any other content created or recommended by individuals.

Current methods of sharing information are based on either hierarchies or binary (all or nothing) solutions. For example, a user may share a work calendar with co-workers, or an individual may share a digital photo album with family members. However, such methods are restricted in their ability to share content or vary what is shared between or across individuals or groups. Furthermore, such systems do not provide easy and quick customizing of the sharing.

Accordingly, it is an object of the present invention to provide systems and methods for allowing diverse and customizable sharing of electronic items with third parties, which may be individuals and/or groups.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Aspects of the present invention relate to systems and methods for allowing the sharing of content with one or more individuals or groups. In embodiments, shared content may be associated with one or more identifiers, or tags. These tags may be used to grant sharing rights to individuals or groups.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including general purpose computers, specialized computers, mobile devices (including without limitation mobile telephones, personal data assistants (PDAs), and multimedia devices), and the like. The embodiments of the present invention may be implemented in software, hardware, firmware, or combinations thereof. It shall be noted that the specific implementation is not critical to the present invention.

Reference in the specification to "one embodiment" or "an embodiment" means that a particular feature, structure, characteristic, or function described in connection with the embodiment is included in at least one embodiment of the invention but may be in more than one embodiment. The appearances of the phrase "in one embodiment" or "in an embodiment" in various places in the specification are not necessarily all referring to the same embodiment.

Aspects of the present invention involve systems and methods of sharing information using metadata as a basis for permission, which metadata may also be referred to herein as a tag or label. The systems and methods of the present invention may be embodied in an application, web service, or web site, which may be a calendaring application or multimedia application that involves one or more forms of media (photos, graphics, videos, texts, animations, hyperlinks, website, and the like). In embodiments, the application may be an Internet application or a networked application, wherein a user and/or the third parties (individuals and/or groups) with which the user shares content interface with the application through a browser or application interface. It shall be noted that neither the specific implementation of the methods of the present invention nor the specific implementations of a device or system is critical to the present invention.

A. Methods for Sharing User Items

Figure 1:
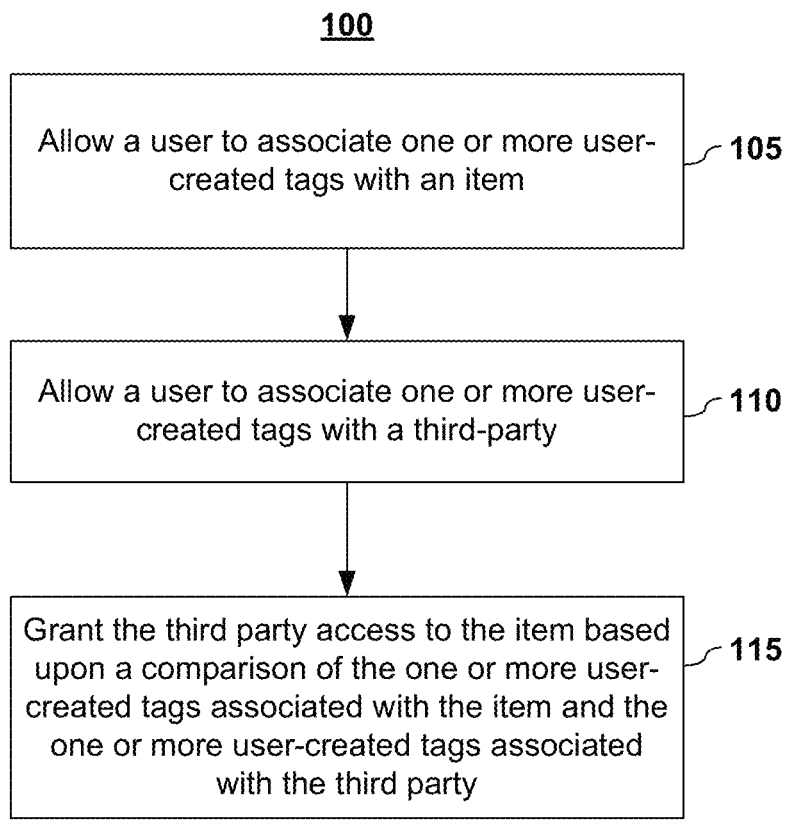
FIG. 1 depicts a method for sharing content items with a third party using metadata according to embodiments of the present invention.

FIG. 1 depicts a method 100 for sharing content items with a third party using metadata according to embodiments of the present invention. A user's content is treated holistically and the user may append metadata to the content item in the form of tags or labels. The user can have one or more descriptive tags associated (105) with a content item. In embodiments, the user may create the tag designations. The user-created tags may be selected from a pre-existing or pre-populated list. In embodiments, a user interface may be presented to a user to facilitate the associating of one or more tags with content items. For example, an entry interface may be provided wherein the user may input or select tags.

A user also can have one or more tags associated (110) with a third party or third parties. The third parties may be individuals or groups of individuals. In embodiments, a user interface may be presented to a user to facilitate the associating of one or more tags with a third party. In embodiments, a contacts or buddy profile may include a section for the user to input or select tags. In embodiments, the user may create the tag designations. In embodiments, the user-created tags may be selected from a pre-existing or pre-populated list.

Figure 2:
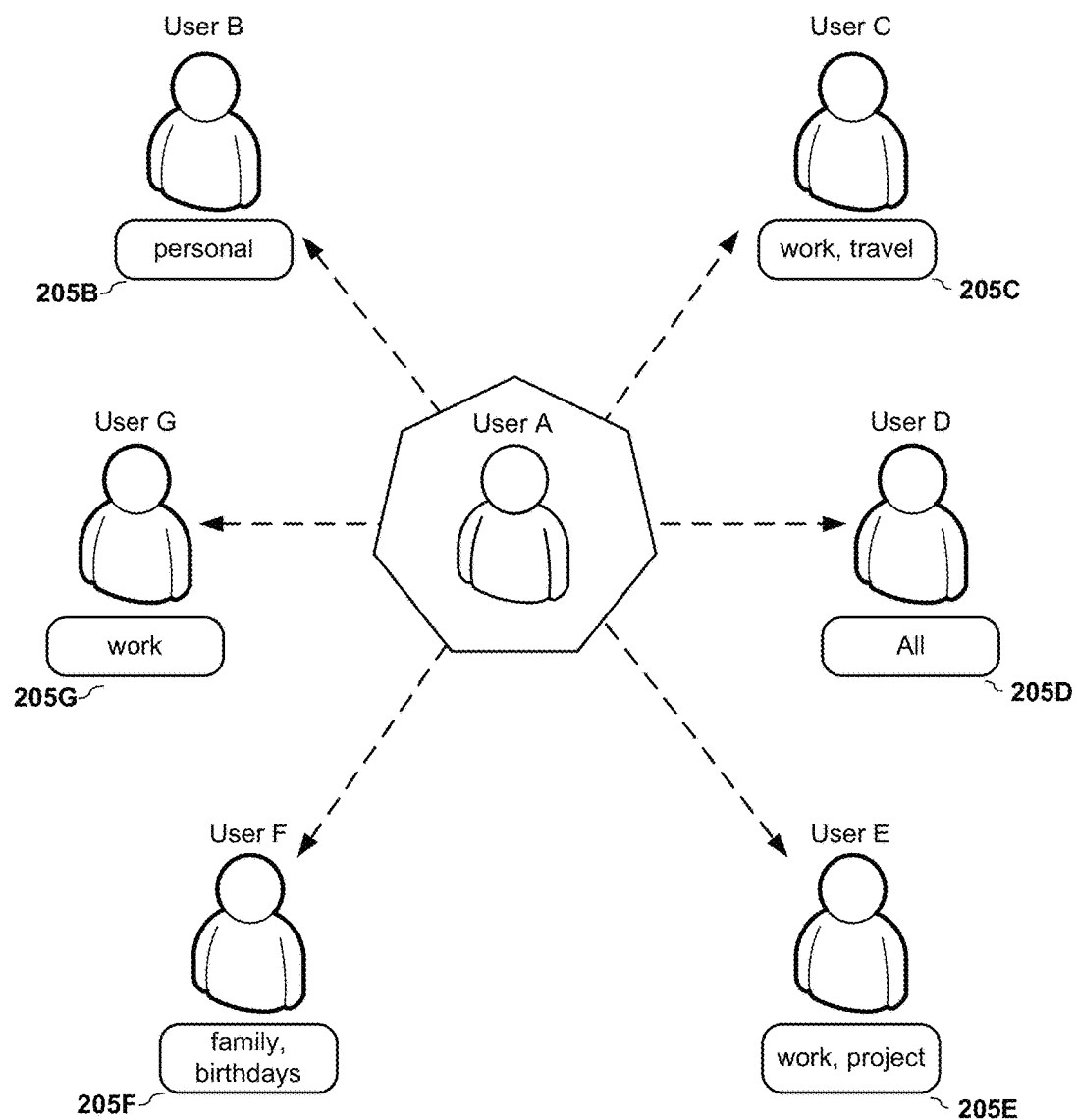
FIG. 2 graphically depicts, for purposes of illustration, metadata associated with third parties according to embodiments of the present invention.

FIG. 2 graphically depicts, for purposes of illustration, metadata associated with third parties according to embodiments of the present invention. In the depicted example, User A has metadata 205 associated with Users B, C, D, E, F, and G. For example, User B is associated with the tag "personal," User C is associated with the tags "work" and "travel," User D is associated with the tag "All," and so forth. As depicted in FIG. 2, a third party may have a single tag association or may have more than one tag association.

It should be noted that the metadata associated with a third party may be obtained from another service or context. For example, if User A interacts with third parties through a social networking application, information related to the User A's interactions with third parties, such as key words from messages, profile information, or the like may be used or imported as part of the associated metadata.

By associating (110) one or more tags with a third party or third parties, the user may grant access (115) to none, some, or all of the content items using the associated tags. The granting of access to a content item may be based upon a comparison of metadata associated with the content item and metadata associated with a third party. For example, any content items with a "personal" tag are shared with User B; whereas, only content items with a "work" tag are shared with User G. In embodiments, a third party who is granted access to an item may share that item with one or more additional parties. Furthermore, the third party may add or otherwise re-tag the event for sharing purposes. For example, individual A may share an item with a label "work" with individual B, and individual B could re-share or syndicate the event to individual C under a tag, such as "executives," which was set by individual B.

It shall be noted that the comparison to grant access to content items may be performed in any fashion or combination using, for example one or more logical operators, such as Boolean operators, conditionals, and the like. In embodiments, logical operations may be implied. For example, a listing of descriptive tags with no logical operator may be implied to be the logical operator "OR," which creates unions of content items that contain at least one of the listed tags. In embodiments, logical operations may be expressly included as part of the metadata. Alternatively, a tag may include a logical operation or operations (e.g., "Work but not Travel" may be considered a tag, and as a tag would share all content items with a "Work" label so long as there is not also a "Travel" tag associated with the content item). It should also be noted that a tag may represent a set or subset of other tag (the tag "All" may be defined to be equivalent to listing all descriptive tags linked with the logical operator "OR"). In embodiments, tags may also be used to set levels of permissions including read and write permissions to content items. One skilled in the art shall recognize that a particular benefit of the present invention is the ability to quickly and easily create complex sharing arrangements.

Figure 3:
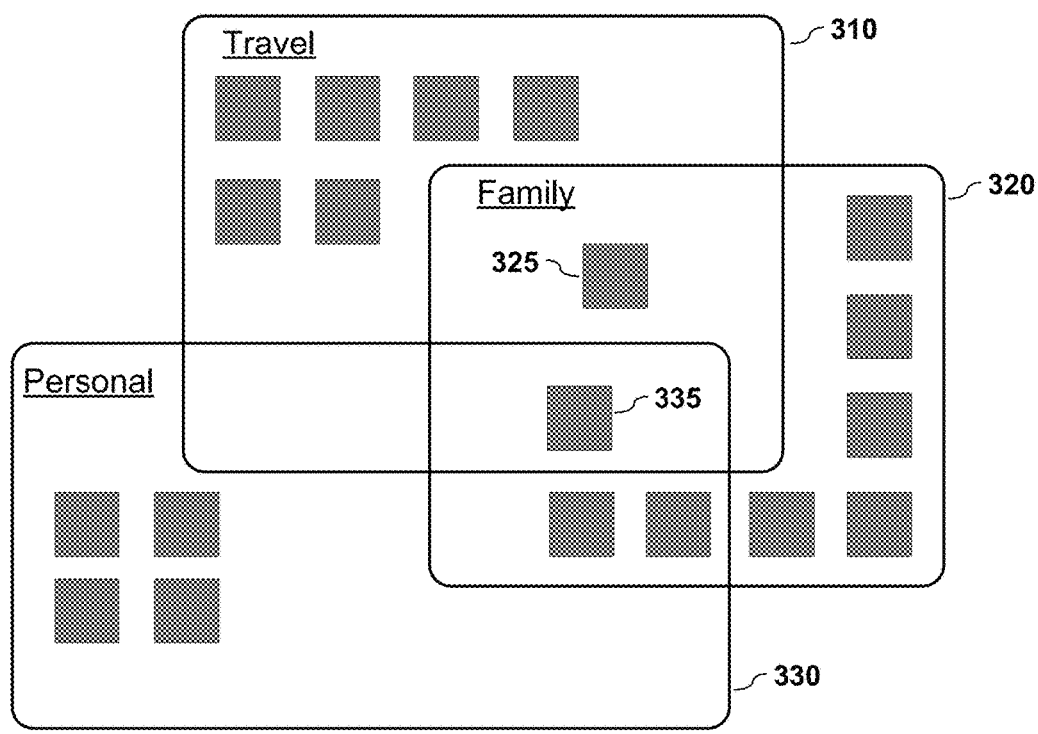
FIG. 3 graphically depicts, for purposes of illustration, a method of sharing content with third parties and/or generating views of content using metadata according to embodiments of the present invention.

Consider, by way of illustration and not limitation, the example shown in FIG. 3. FIG. 3 graphically depicts the metadata associated with content items according to embodiments of the present invention. The content items may be any electronic content such as pictures, sound files, links, text files, data files, video, calendar events, etc. As illustrated, the content items have been classified with tags "Travel" (310), "Family" (320), and "Personal" (330). A user may associate "Travel, Family" with Third Party A, "Travel and Family" with Third Party B, and "Travel and Family but not Personal" with Third Party C. Assuming the logical operator OR, Third Party A would have access to all Travel items 310 as well as all Family items 320. Third Party B would have access to all items that are labeled with both Travel and Family, which are items 325 and 335; whereas, Third Party C would only have access to item 325 because item 335 is also labeled as Personal.

Figure 4:
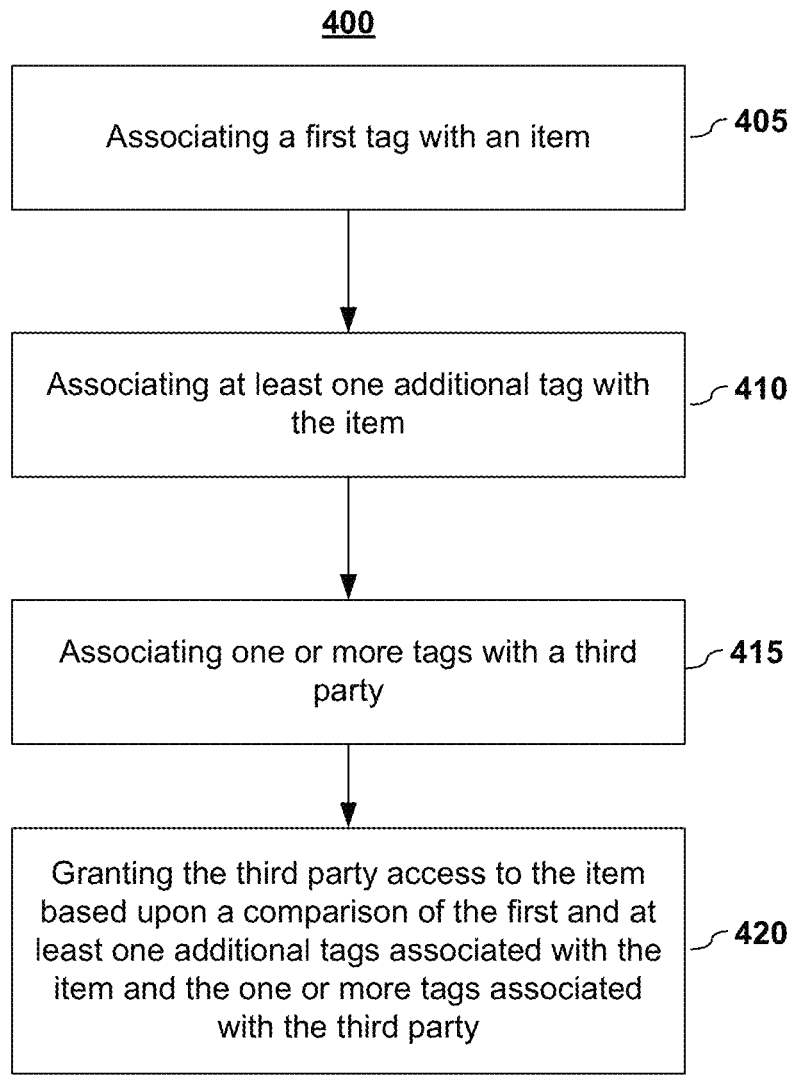
FIG. 4 depicts an alternative method for sharing content items with a third party using metadata according to embodiments of the present invention.

FIG. 4 depicts an alternative method 400 for sharing content items with a third party using metadata according to embodiments of the present invention. A user can associate (405) a first metadata descriptor with a content item.

At least one additional metadata descriptor is also associated (410) with the content item, wherein the first metadata descriptor and the at least one additional metadata descriptor are concurrently associated with the content item. The phrase "concurrently associated" shall be construed to mean that there is at least some time period of overlap. Thus, concurrently associated shall include situations in which a first tag is associated and then one or more additional tags are subsequently associated. Thus, concurrently associated shall include situations in which tags are edited, added, or removed so long as at a time when access rights are determined for a third party a plurality of tags are associated. The user associates (415) one or more tags with a third party, and the third party may be granted access (420) to the content item based upon a comparison of the tags associated with the content item and the one or more tags associated with the third party. In embodiments, the user may create the tag designations. In embodiments, the tags may be selected from a pre-existing or pre-populated list. In embodiments, a third party who is granted access to an item may share that item with one or more additional parties, including sharing the event with additional third parties using the same or different tag designations.

Figure 5:
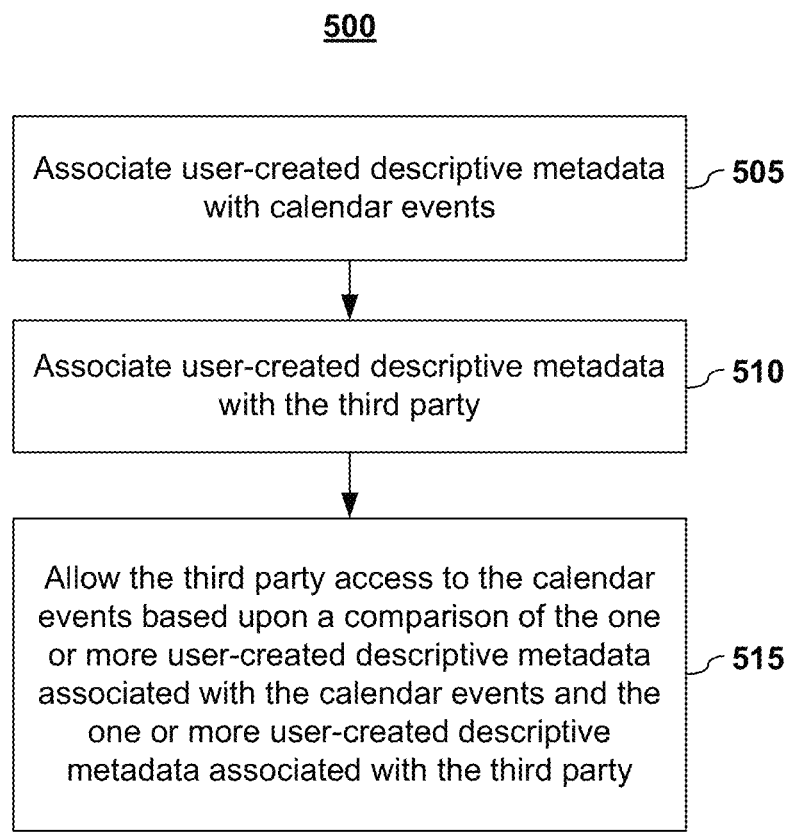
FIG. 5 depicts a method of sharing calendar events with third parties using metadata according to embodiments of the present invention.
Figure 6A:
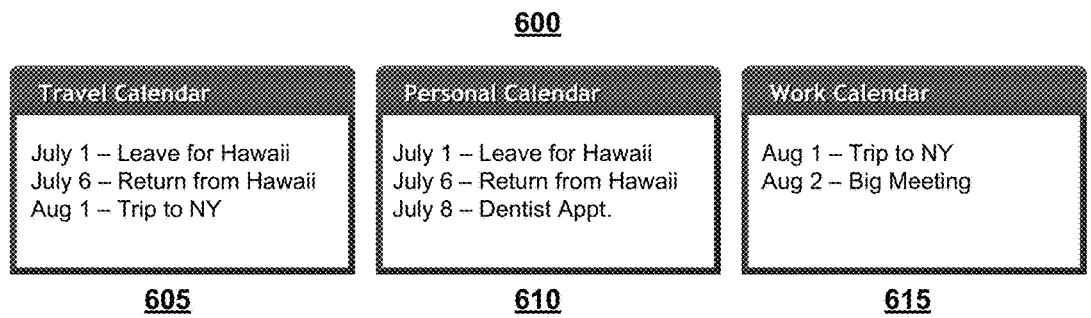
FIG. 6A depicts, for purposes of illustration, a prior art method of sharing calendars, which required the creation of multiple calendars.

FIG. 5 depicts a method of sharing calendar events with third parties using metadata according to embodiments of the present invention. Currently, several software programs and web services allow users to create multiple calendars (each comprised of distinct events) that may then be shared with others or publicly distributed. That is, if an individual wishes to share events with co-workers, the individual must create a specific shared calendar, in this case a work calendar. If the individual wants one group of co-workers to see more or less of the work calendar events, a separate work calendar must be created for that group. Thus, sharing of the calendar events involve the creation and maintaining of multiple, sometime largely duplicative, calendars. FIG. 6A depicts, for purposes of illustration, a previous method 600 of sharing calendars, which requires the creation of multiple calendars. In the depicted example, to have a shared calendar for travel 605, a shared calendar for personal items 610, and a shared calendar for work 615 requires having multiple calendars. A user might also have to maintain yet another calendar if the user wanted a single calendar with all of the events.

Figure 6B:
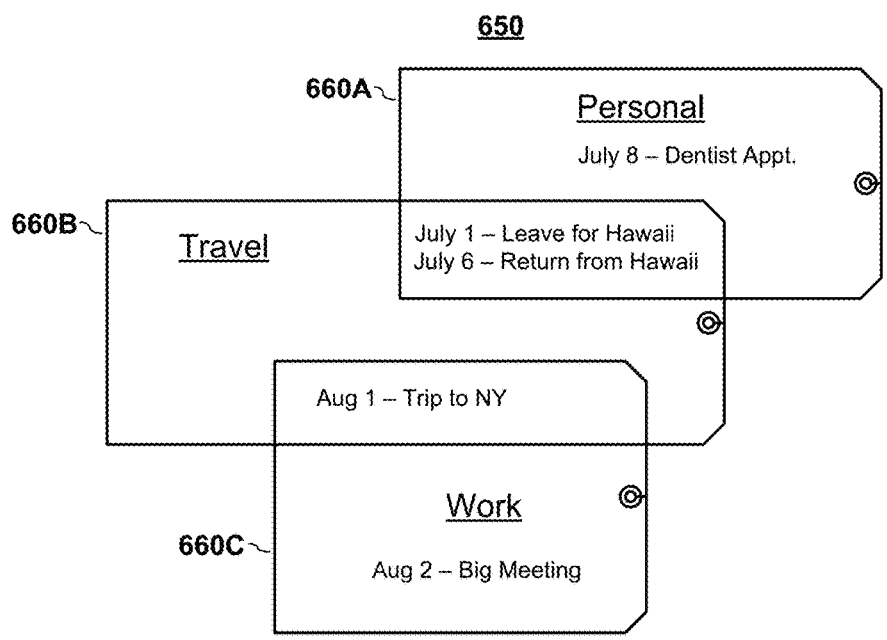
FIG. 6B graphically depicts, for purposes of illustration, a method of sharing calendar events using metadata according to embodiments of the present invention.

In contrast, embodiments of the present invention provide methods for segmenting items of information (events, photos, videos, links, text, etc.) so that they may be easily shared with others without having to duplicate efforts. FIG. 6B graphically depicts, for purposes of illustration, sharing of calendar items using metadata according to embodiments of the present invention. Instead of having to maintain multiple calendars, the user may maintain a single calendar 650 and share events using metadata 660 associated with the events.

Returning to FIG. 5, a user (e.g., User A) may append or otherwise associate metadata (505) in the form of user-created descriptive tags with at least some of User A's events. For example, User A may enter or select the information displayed in Table 1.

TABLE 1

| Date | Event | Tag |
|------|-------|-----|
| May 1 | Jen's Birthday | Personal, Birthdays |
| June 2 | Trip to Denver | Work, Travel |
| June 10 | Jack's Birthday | Birthday, Work |
| July 2-7 | Trip to Baltimore | Personal, Travel |

User A associates (510) user-created tags with third parties that User A wishes to share events with. In embodiments, content items may be shared actively with other users who have been made buddies to User A through an application service.

These third parties are allowed access (515) to the calendar events based upon a comparison of the one or more user-created descriptive metadata associated with the calendar events and the one or more user-created descriptive metadata associated with the third party. For example, User A may allow User X to view all events with the tag: birthdays. User X would be able to view the events on May 1 ("Jen's Birthday") and June 10 ("Jack's Birthday"). User A may allow User Y to view all events with the tags: personal or travel. User Y would be able to view the events on May 1 ("Jen's Birthday"), June 2 ("Trip to Denver"), and July 2-7 ("Trip to Baltimore"). User A may instead allow User Y to view all events with the tags: personal and travel. In that case, User Y would only be able to view the calendar event July 2-7 ("Trip to Baltimore"). In embodiments, a display of the shared events may appear on public facing obfuscated URL. In embodiments, a specific URL may be created for each subset of content to be shared. In embodiments, a third party who is granted access to an item may share that item with one or more additional parties, including sharing the event using a tag or tags designated by the third party.

Figure 7:
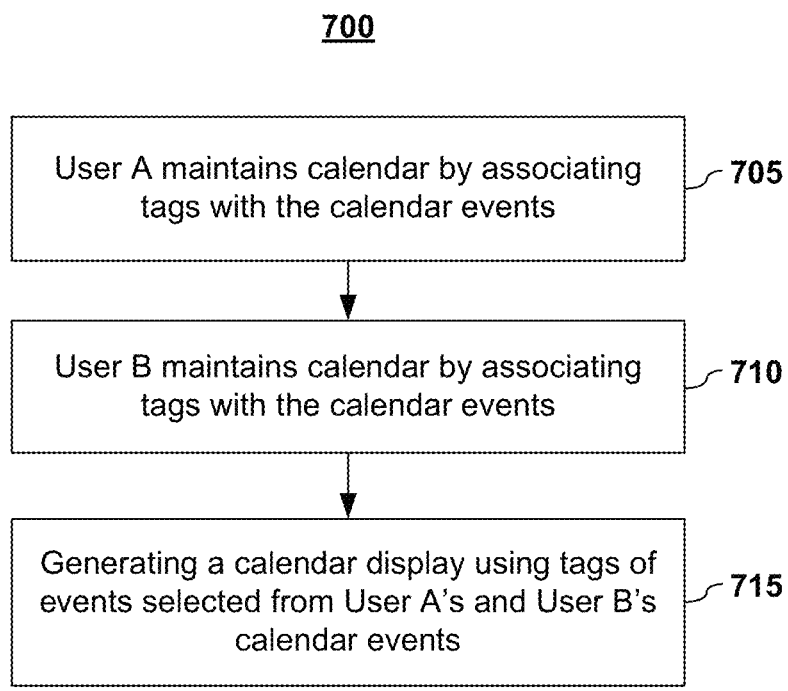
FIG. 7 depicts a method of collaboratively generating a shared calendar using metadata according to embodiments of the present invention.

As noted previously, typical shared calendars involved the creating of a separate, group calendar. It should be noted that another aspect of the present invention is its ability to easily create and maintain shared calendars by generating views of content based upon metadata. FIG. 7 depicts a method of collaboratively generating a shared calendar using metadata according to embodiments of the present invention. User A maintains a calendar. User A may maintain on the calendar only events that are associated with a specific group, or User A may maintain many different types of events. User A organizes these events by associating (705) tags with the calendar events. Similarly, another user, User B, maintains a calendar with calendar events that are associated (710) with tags. A display of the shared calendar can be generated (715) using the tagged events selected from User A and User B. The display may be just the common events shared between User A and User B. In an embodiment, the shared events may appear at a shared location, such as at a specific URL address, where both User A and User B have access. Alternatively, additional third parties may also have access to the shared calendar display. In embodiments, a third party who is granted access to an item may share that item with one or more additional parties, including sharing the event with additional third parties using the same or different tag designations.

In alternative embodiments, User A may request the generation of a display that has the shared event as well as other events for User A, which display may only be accessible by User A. Additional displays may be easily generated by changing the tags that are shared, the users that share, or both.

One skilled in the art shall recognize a number of advantages of the present invention. For example, there are several important efficiencies created using aspects of the present invention. In existing calendar interfaces, the multiple calendar paradigm would present a need to enter redundant events. For example, certain events to be shared with different audiences would have to be entered twice, once on each calendar. With sharing by tags, a single event may be shared with various audiences. Furthermore, sharing privileges may be easily changed at a user/buddy level or at a tag level by modify the tags a user can view or by changing the tag associated with content. Also, as noted previously, more robust or complex sharing scenarios may be used by applying conditions or logical operations on the tags. Other advantages will be apparent to those skilled in the art.

B. Systems for Sharing User Items

Figure 8:
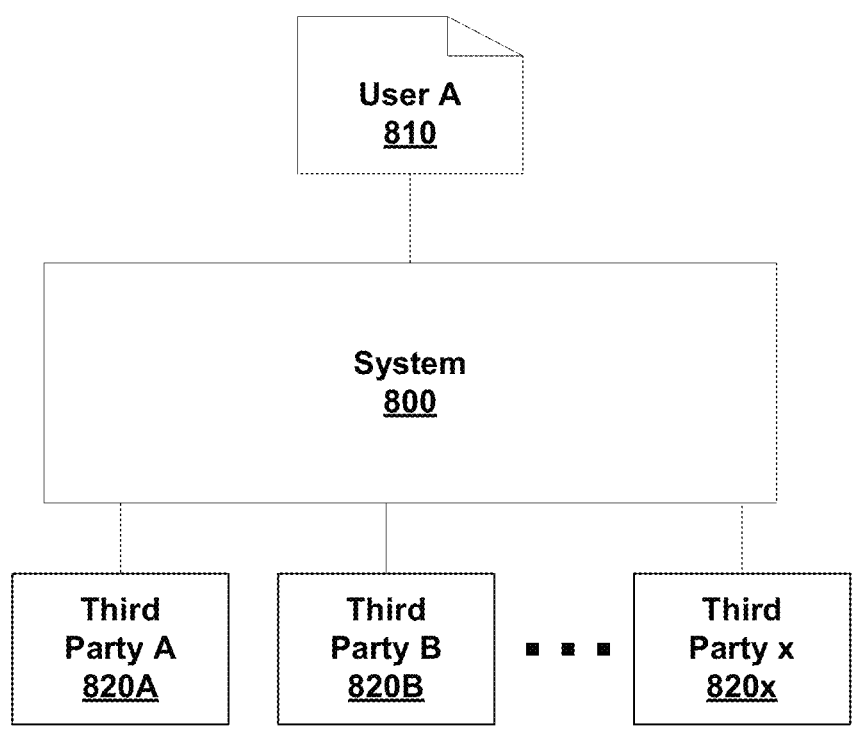
FIG. 8 graphically depicts a system for sharing content items with one or more third parties using metadata according to embodiments of the present invention.

FIG. 8 graphically depicts a system for sharing content items with one or more third parties using metadata according to embodiments of the present invention. As depicted in FIG. 8, a user 810 interfaces with a system 800 that facilitates the sharing of content items with one or more third parties 820. In embodiments, the user may interface with the system 800 via a client computer 810. In embodiments, the system 800 may be an Internet application or a networked application, wherein the user 810 and/or the third parties 820 (individuals and/or groups) with which the user shares content interface with the application through a browser or interface. It shall be noted that the specific implementations of the system is not critical to the present invention.

Consider, by way of illustration and not limitation, the following example. A user 810 registers with a web service, such as 30Boxes.com, and keeps a calendar of events and other content on their system 800. In an embodiment, a user may be an individual or group that uses the web services and may have an entry in a user database tied to one or more email addresses. A server of the web services 800 may store the user database, which may also include profile information. A "buddy" may comprise a web services profile tied with a database entry to another profile. In an embodiment, a profile may indicate a relationship between the users, such as a trusted relationship, and may also contain metadata.

The user 810 can have metadata associated with calendar events stored on the system 800 and can also have metadata associated with one or more third party 820. In embodiments, metadata may be passed from a client (e.g., 810) to a server (e.g., 800) through one of several means (including, but not limited to, http GET, POST, email, SMS, IM, etc.) where it may be parsed and stored as a field. Third parties may interface with system 800 to obtain access to the content of the user. In embodiments, one or more of the third parties may access the content indirectly from system 800. For example, system 800 may have the content to which a third party has permissions forwarded to the third party via another service (e.g., email, instant message, forward to another application, etc.). Thus, it should be noted that a third party need not be a user of the services provided by system 800 nor must they directly connect with the system 800.

Figure 9:
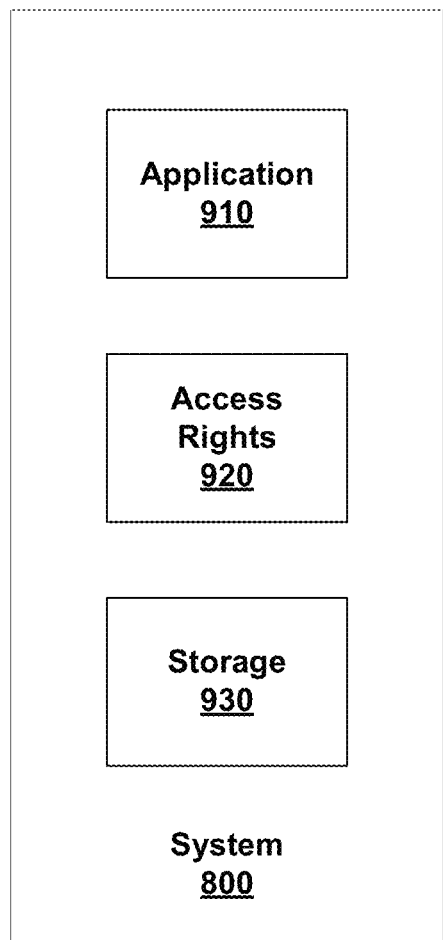
FIG. 9 depicts a function block diagram of a system for sharing content items with one or more third parties using metadata according to embodiments of the present invention.

FIG. 9 depicts a function block diagram of a system 800 for sharing content items with one or more third parties using metadata according to embodiments of the present invention. Depicted in FIG. 9 is an application 910, an access rights module 920, and storage 930. In embodiments, application 910 interfaces with the user to receive tags to be associated with content items and tags to be associated with third parties.

The content items and the tag information may be stored in storage 930. In embodiments, application 910 may also facilitate the display or transfer of content items to the user and to third parties. Application 910 may also represent a service or services that utilizes the content items as well as facilitates sharing. For example, application 910 may be a calendaring application, photo sharing application, blog, or the like.

When a request to access content is received, access rights module 920 performs a comparison to determine what content items are to be shared, if any. System 800 may be implemented on a computing/instruction-executing device.

Figure 10:
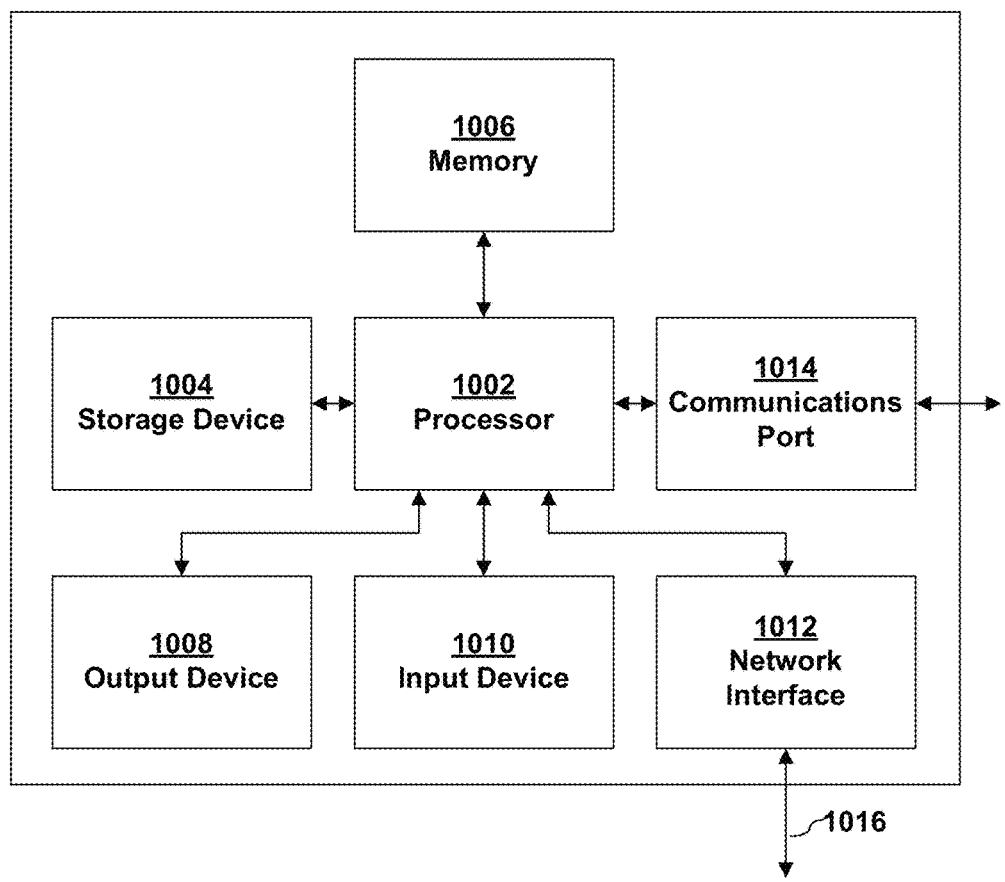
FIG. 10 depicts a function block diagram of a computing system according to embodiments of the present invention.

FIG. 10 depicts a functional block diagram of an embodiment of an instruction-execution/computing device 1000 that may implement or embody embodiments of the present invention. As illustrated in FIG. 10, a processor 1002 executes software instructions and interacts with other system components. In an embodiment, processor 1002 may be a general purpose processor such as an AMD processor, an INTEL x86 processor, a SUN MICROSYSTEMS SPARC, or a POWERPC compatible-CPU, or the processor may be an application specific processor or processors. A storage device 1004, coupled to processor 1002, provides long-term storage of data and software programs. Storage device 1004 may be a hard disk drive and/or another device capable of storing data, such as a computer-readable media (e.g., diskettes, tapes, compact disk, DVD, and the like) drive or a solid-state memory device. Storage device 1004 may hold programs, instructions, and/or data for use with processor 1002. In an embodiment, programs or instructions stored on or loaded from storage device 1004 may be loaded into memory 1006 and executed by processor 1002. In an embodiment, storage device 1004 holds programs or instructions for implementing an operating system on processor 1002. In one embodiment, possible operating systems include, but are not limited to, UNIX, AIX, LINUX, Microsoft Windows, and the Apple MAC OS. In embodiments, the operating system executes on, and controls the operation of, the computing system 1000.

An addressable memory 1006, coupled to processor 1002, may be used to store data and software instructions to be executed by processor 1002. Memory 1006 may be, for example, firmware, read only memory (ROM), flash memory, non-volatile random access memory (NVRAM), random access memory (RAM), or any combination thereof. In one embodiment, memory 1006 stores a number of software objects, otherwise known as services, utilities, components, or modules. One skilled in the art will also recognize that storage 1004 and memory 1006 may be the same items and function in both capacities. In an embodiment, one or more of the components of FIG. 9 may be modules stored in memory 1004, 1006 and executed by processor 1002.

In an embodiment, computing system 1000 provides the ability to communicate with other devices, other networks, or both. Computing system 1000 may include one or more network interfaces or adapters 1012, 1014 to communicatively couple computing system 1000 to other networks and devices. For example, computing system 1000 may include a network interface 1012, a communications port 1014, or both, each of which are communicatively coupled to processor 1002, and which may be used to couple computing system 1000 to other computer systems, networks, and devices.

In an embodiment, computing system 1000 may include one or more output devices 1008, coupled to processor 1002, to facilitate displaying graphics and text. Output devices 1008 may include, but are not limited to, a display, LCD screen, CRT monitor, printer, touch screen, or other device for displaying information. Computing system 1000 may also include a graphics adapter (not shown) to assist in displaying information or images on output device 1008.

One or more input devices 1010, coupled to processor 1002, may be used to facilitate user input. Input device 1010 may include, but are not limited to, a pointing device, such as a mouse, trackball, or touchpad, and may also include a keyboard or keypad to input data or instructions into computing system 1000.

In an embodiment, computing system 1000 may receive input, whether through communications port 1014, network interface 1012, stored data in memory 1004/1006, or through an input device 1010, from a scanner, copier, facsimile machine, or other computing device.

One skilled in the art will recognize no computing system is critical to the practice of the present invention. It shall be understood that devices or components (or modules), that may be shown in block diagrams are illustrative of embodiments of the invention and are meant to avoid obscuring the invention. It shall also be understood that devices or components may be described as separate functional units, which may comprise sub-units, but those skilled in the art will recognize that the various devices or components, or portions thereof, may be physically and/or functionally divided into separate devices or components or may be physically and/or functionally integrated together, including integrating within a single system, device, or component.

Furthermore, connections between devices, systems, and components are not intended to be limited to direct connections. Rather, data between these items may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

It shall be noted that the present invention may be implemented in any instruction-execution/computing device or system capable of processing data, including without limitation, a general-purpose computer and a specific-purpose computer. The present invention may also be implemented into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the spirit and scope of the information disclosed herein.

What is claimed is:

1. A computer-implemented method for facilitating sharing of one or more content items via an application, the method comprising:
   receiving data, via one or more processing devices, from a first user of the application for forming a group comprising a group identifier comprising one or more identifiers and an associated set of one or more identified third-party users;
   receiving from the first user, via one or more processing devices, a content item, which is associated with an access identifier comprising one or more identifiers; and
   responsive to a group identifier satisfying an access rule that defines a relationship between the access identifier of the content item and a group identifier and is used to ascertain access rights to the content item by comparing the group identifier with the access identifier according to the access rule, allowing the set of one or more identified users associated with the group identifier access to the content item,
   wherein the access rule grants a third-party user associated with a group identifier access to the content item responsive to at least one identifier in the access identifier of the content item being common with at least one identifier associated with the group identifier.

2. The computer-implemented method of claim 1 wherein the access rule is a default rule.

3. The computer-implemented method of claim 1 wherein at least one identifier of the group identifier is a descriptor of the group.

4. The computer-implemented method of claim 3 wherein the descriptor describes a relationship or relationships between the first user and the associated set of one or more identified third-party users of the group.

5. The computer-implemented method of claim 1 wherein an identified third-party user is a member of a plurality of groups.

6. The computer-implemented method of claim 1 wherein the access identifier grants access to the content item to more than one group.

7. At least one non-transitory tangible computer-readable medium comprising one or more sequences of instructions which, when executed by one or more processors, causes the one or more processors to perform the method of claim 1.

8. A computer-implemented method for facilitating sharing of content items via an application, the method comprising:
   receiving from a user of the application, via one or more processing devices, an assignment of one or more labels comprising one or more terms to a third party associated with the user;
   receiving from the user, via one or more processing devices, a content item, which is associated with a content label comprising one or more terms; and
   responsive to a label and a content label satisfying a privileges rule that is used to ascertain privileges to the content item by comparing the label with the content label according to the privileges rule, allowing a third party associated with the label one or more privileges to the content item,
   wherein the privileges rule grants the third party privileges to the content item responsive to at least one term in the content label being common with at least one term of the one or more labels associated with the third party.

9. The computer-implemented method of claim 8 further comprising:
   providing one or more user interfaces to the user to facilitate the assignment of a third party to one or more of the labels.

10. The computer-implemented method of claim 8 wherein at least one term of the one or more labels for categorizing at least some third parties is descriptive of a characteristic of the third parties associated with the at least one term.

11. At least one non-transitory tangible computer-readable medium comprising one or more sequences of instructions which, when executed by one or more processors, causes the one or more processors to perform the method of claim 8.

12. A computer-implemented method for sharing content items with one or more third parties, the method comprising:
   receiving from a user, via one or more processing devices, a content item, which is associated with one or more tags;
   receiving from the user, via one or more processing devices, an association of one or more tags with a third party;
   storing in one or more storage media the content item and its associated one or more tags and the association of one or more tags with a third party; and using an access rule to determine access to the content item for the third party by comparing, using at least one processor unit, at least one of the one or more tags associated with the content item with at least one of the one or more tags associated with the third party, and responsive to the access rule being satisfied, granting the third party access to the content item, wherein the access rule grants a third party access responsive to at least one tag being common between the one or more tags associated with the content item and the one or more tags associated with the third party.

13. The computer-implemented method of claim 12 wherein the access rule is a default rule.

14. The computer-implemented method of claim 12 wherein the one or more tags associated with the content item are descriptive of the content item.

15. The computer-implemented method of claim 12 wherein the one or more tags associated with the third party are descriptive of a relationship or relationships between the user and the third party.

16. At least one non-transitory tangible computer-readable medium comprising one or more sequences of instructions which, when executed by one or more processors, causes the one or more processors to perform the method of claim 12.

* * * * *